3,287,442
POLYCARBONATE ELASTOMERS

John R. Caldwell and Winston J. Jackson, Jr., Kingsport, Tenn., assignors to Eastman Kodak Company, Rochester, N.Y., a corporation of New Jersey
No Drawing. Filed Oct. 18, 1962, Ser. No. 231,589
16 Claims. (Cl. 260—858)

This application is a continuation-in-part of our copending application Serial No. 137,980 entitled, Bisphenol Polyesters, filed September 14, 1961, and now abandoned.

This invention relates to elastomeric polymers and more particularly to highly elastic polycarbonate compositions suitable for the production of various products in which good elastic recovery is important. More specifically, the invention relates to novel highly elastic polymeric compositions useful in the production of filaments, films, and shaped articles having not only excellent elastic and tensile properties but also high softening points and solubility in low-boiling solvents.

Recently, elastomeric filaments, fibers, films, and the like produced from various polymer compositions have become very important to the textile industry. However, in some cases it has been extremely difficult to attain in one and the same material the combination of properties desired such as solubility in low-boiling solvents, high softening point, good tensile properties, and a high elastic recovery. It has, therefore, been necessary for these elastomeric materials to be produced in which some of the desired properties are compromised. In J. Poly. Sc., 55, 343 (1961) a block copolycarbonate elastomer is described which was prepared from 4,4'-isopropylidenediphenol and poly-(tetramethylene oxide) glycol. This polymer is soluble in methylene chloride and it has an elongation of 600 percent, but its elastic recovery is only 95 percent and fibers of the polymer have a relatively low bar-sticking temperature. Fibers and film of a random or non-blocked copolycarbonate elastomer prepared with this bisphenol and polyether glycol, as described in Example 11 of the present specification, have elastic recoveries of only 93–96 percent and a low bar-sticking temperature (90–100° C.). U.S. Patent 3,023,192 describes elastomeric polyesters. These polymers not only are insoluble in low-boiling solvents, such as methylene chloride, but they also have low tenacities. The high-melting, non-crosslinked elastomeric polymers which have been reported up to this time are composed of two types of segments: a high-melting, polymeric, crystalline segment and a low-melting, polymeric, relatively noncrystalline segment. These segments are chemically bonded together in the polymer chain. In polyester elastomers, such as described in U.S. Patent 3,023,192, the high-melting, crystalline segment consist of a high-melting, crystalline polyester, and the low-melting, relatively non-crystalline segment consists of a low-melting, relatively non-crystalline polyether or polyester. In the polycarbonate elastomers described in J. Poly. Sc., 55, 343 (1961) the crystalline segment is composed of units of the 4,4'-isopropylidenediphenol polycarbonate. The elastomeric polymers of this invention, on the other hand, are unique in that they do not contain a crystalline segment. These elastomers are, therefore, the first high-melting elastomers to be reported which do not contain a crystalline portion.

The invention has for its principal object to provide highly elastic polycarbonate compositions which are soluble in low-boiling solvents and which are especially adapted to the manufacture of filaments, fibers, yarns, films, and other shaped objects having high softening temperatures, good tensile properties and excellent elastic properties.

Another object is to provide highly elastic polycarbonate compositions from which filaments, fibers, and yarns having high softening temperatures, good tensile properties, high elongation, and excellent elastic recovery may be produced.

Another object is to provide stable filaments, fibers, and yarns having high softening temperatures, good tensile properties, high elongation, and excellent elastic recovery.

Another object is to provide stable films and other shaped objects having high softening temperatures good tensile properties, high elongation, and excellent elastic recovery.

Other objects will appear hereinafter.

These objects are accomplished by the following invention which, in one embodiment, comprises forming a highly elastic high polymeric polycarbonate by reacting (A) at least one compound selected from the class consisting of bisphenols having the following general formula:

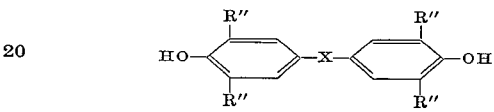

wherein R" is a member selected from the group consisting of hydrogen atoms, halogen atoms, and alkyl groups containing from 1 to 4 carbon atoms and X is a gembivalent radical consisting essentially of a saturated polycyclic structure which includes at least one saturated bicyclic atomic-bridged hydrocarbon ring member and (B) at least one member of average molecular weight about 500–5000 of the group consisting of hydroxy-terminated and chloroformate-terminated polyethers, polyformals, polyesters, aliphatic polycarbonates, and poly(etherurethanes) and (C) phosgene.

For purposes of clarity and of properly disclosing and defining our invention, the following definitions are given:

*Inherent viscosity.*—This property, used as a measure of the degree of polymerization of a polymeric compound, is defined as:

$$\frac{\ln \eta_r}{C}$$

wherein $\eta_r$ is the viscosity of a dilute (approximately 0.25 percent by weight) solution of the polymer in chloroform divided by the viscosity of the solvent, and C is the concentration of the polymer in grams per 100 cc. of the solution.

*Softening point.*—This value is the minimum temperature at which the polymer sample leaves a slight trail when moved across a heated, polished, stainless steel bar.

*Tenacity.*—This is a measure of the strength of the fiber, filament, or yarn under study. Expressed in grams per denier, it is calculated by dividing the initial denier of the fiber under study into the tension (in grams) required to break the yarn. The values reported in this invention were determined on 2-inch specimens at a rate of extension of 1000 percent per minute in an Instron Tester manufactured by Instron Engineering Corporation, 2500 Washington Street, Canton, Massachusetts.

*Elongation.*—This is a measure of the extent to which a fiber, filament, or yarn is stretched when it breaks. Expressed in percent, it is calculated by dividing the original length into the increase in length and multiplying by 100.

Because of the high elongations of elastomeric yarns, the fiber samples suffer a marked diminution of their diameters during their elongation. Thus, samples mounted in the jaws of an Instron Tester have a tendency to slip during the stretching, and elongations determined in this manner are frequently larger than their true values. A more reliable value is obtained by stretching the fiber sample by hand. The elongations reported in this invention were obtained by placing two marks 20 cm. apart on the fiber sample and extending the sample by hand until it broke. The distance which separated the marks at the time of breakage was noted and the elongation calculated. The average of several determinations was used as the value of the sample in question.

*Elastic recovery.*—This property is a measure of the ability of a fiber, yarn, or filament to return to its original length after elongation. The percent elastic recovery is obtained by dividing the original elongation into the elongation which is recovered after 1 minute and multiplying by 100. Thus, if a fiber sample 25 cm. in length is stretched 400 percent to 125 cm. and it recovers to 30 cm. in length after 1 minute, the original elongation is 100 cm. and the elongation which is recovered is 95 cm. The elastic recovery is, therefore, 95 percent. The elastic recovery of films is similarly determined.

*Bar-sticking temperature.*—This is a measure of the resistance to heat of a fiber, yarn, or filament. It is obtained by determining the minimum temperature at which the sample, under very light tension, sticks to a heated, polished, stainless steel bar.

The high softening points and excellent elastic recovery of the elastomeric polymers of this invention are due to the bisphenols used. In the above bisphenol general formula, X is a gem-bivalent radical consisting essentially of a saturated polycyclic structure which includes at least one saturated bicyclic atomic-bridged hydrocarbon ring member. Examples of radical X include the following:

Other bisphenols which may be used in this invention are disclosed in our copending application, Serial Number 137,980, entitled, "Bisphenol Polyesters," filed on September 14, 1961, and now abandoned. The copending application describes other polycyclic structures in addition to the above structures containing various substituents on the alicyclic rings. The syntheses of all of these bisphenols are described in the above copending application. In addition, radical X in the bisphenol general formula may have the following structure:

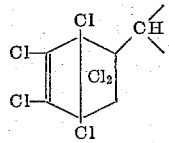

This bisphenol is described in our copending application Serial Number 137,971, entitled, "Polycarbonates of Bisphenols," filed on September 14, 1961. The bisphenols are prepared by treating the corresponding aldehyde or ketone with a phenolic compound in an acidic medium:

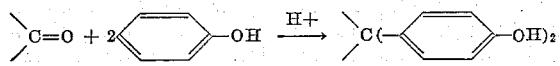

Hydrochloric acid is the preferred condensing agent. The reactions with aldehydes are normally exothermic and take place at room temperature. The alicyclic ketones, on the other hand, react very slowly unless the mixtures are heated to 50–100° C. The presence of 3-mercaptopropionic acid also accelerates the reaction appreciably.

The chlorinated and brominated bisphenols are prepared simply by adding chlorine or bromine to the corresponding bisphenol in an inert solvent.

Examples of bisphenols which may be used in preparing the elastomeric polycarbonates of this invention include 4,4'-(2-norcamphanylidene)diphenol, 4,4'-(2-norcamphanylidene)bis[2,6-dichlorophenol], 4,4'-(2-norcamphanylidene)bis[2,6-dibromophenol], 4,4'-(2-norcamphanylmethylene)diphenol, 4,4'-(2-norcamphanylmethylene)bis[2,6-dichlorophenol], 4,4'-(hexahydro-4,7-methanoindan-5-ylidene)diphenol, 4,4'-(decahydro-1,4,5,8-dimethanonaphth-2-ylidene)diphenol, 4,4'-(tricyclo[2.2.1.0$^{2,6}$]-heptan-3-ylidene)diphenol, 4,4'-(bicyclo[2.2.2]oct-2-ylmethylene)-bis[2,6-dichlorophenol], 4,4'-(bicyclo[2.2.2]oct-2-ylidene)-diphenol, 4,4'-(bicyclo[3.2.1]oct-2-ylidene)diphenol, 4,4'-bicyclo[3.2.2]non-2-ylidene)diphenol and 4,4'-[(1,4,5,6,7,7-hexachloro-5-norbornen-2-yl)methylene]diphenol. Two or more bisphenols may be used. In addition, 0.1 to 3 mole percent of a polyphenol may be added, such as 4,4', 4''-(methylidynetriphenol), to introduce some crosslinks in the polymer.

The hydroxy-terminated or chloroformate-terminated short-chain polymers which are added may be polyethers, polyformals, polyesters, aliphatic polycarbonates or poly(ether-urethanes). For convenience they will be referred to as polymer glycols. The average molecular weights may be about 500–5000, but molecular weights of 1500–3500 are preferred. The polymer glycols may consist of mixtures of low and high molecular weight materials. It is preferred, however, that the glycol be a mixture of polymers with a relatively narrow range of molecular weight. The final elastomeric product may consist of 30–85 percent by weight of these short-chain polymers, but the range of 50–70 percent is preferred.

The polyether glycols, many of which are commercially available, have the following general formula:

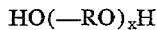

wherein R is a straight-chain or branched-chain alkylene radical containing from 2 to 20 carbon atoms and $x$ is an integer selected to give a polyether having a molecular weight of about 500 to about 5000. Examples of polyether glycols are poly(ethylene oxide) glycol, poly(propylene oxide) glycol, poly(1,2-butylene oxide) glycol, poly(tetramethylene oxide) glycol, poly(hexamethylene oxide) glycol, and poly(decamethylene oxide) glycol. Also, hydroxy-terminated polyvinyl methyl ethers may be used. Poly-(tetramethylene oxide) glycol is preferred. It has the following formula:

wherein $x$ is an integer from about 7 to about 70. Copolyether glycols also may be used, such as a copolymer containing both ethylene oxide and tetramethylene oxide units in the polyether chain. Some of the alkylene radicals in these polyethers may be replaced by arylene or divalent cycloaliphatic radicals. Suitable polyether glycols and copolyether glycols are those which have an average molecular weight within the range of about 500 to about 5000.

The polyformal glycols are prepared from aliphatic diols and paraformaldehyde or aliphatic diols and a dialkyl formal in the presence of acidic catalysts:

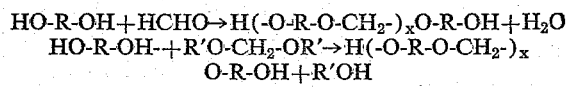

wherein R is a straight-chain or branched alkylene radical containing from 4 to 20 carbon atoms and $x$ is an integer selected to give a polyformal having a molecular weight of about 500 to about 5000. In order to obtain hydroxy-terminated polymers it is necessary to use a slight molar excess of the diol. Procedures for the preparation of polyformals by these methods are described by Caldwell and Jackson in U.S. Patent 2,968,646. This patent describes the preparation of high polymers, but molecular weights of 500–5000 may be obtained by using the calculated molar excess of diol over the paraformaldehyde or dialkyl formal. The paraformaldehyde method is preferred. The diols used in preparing these polyformals may be primary or secondary and may contain 4 to 20 carbon atoms. Examples of such diols are 1,6-hexanediol, 2,6-hexanediol, and 1,10-decanediol. Copolyformal glycols also may be used, such as a copolymer prepared from both 1,4-butanediol and 1,9-nonanediol. Also these copolymers may be prepared with alicyclic diols, such as 1,4-cyclohexanediol and 2,6-norbornanediol or with cycloaliphatic diols, such as 1,3- and 1,4-cyclohexanedimethanol and 2,5- and 2,6-norbornanedimethanol. In addition, 0.1 to 3 mole percent of a polyol may be added to introduce some crosslinks in the polymer. Examples of these include trimethylolethane, trimethylolpropane, and pentaerythritol. Suitable polyformal gylcols and copolyformal gylcols are those which have an average molecular weight within the range of about 500–5000.

The polyester glycols are prepared from aliphatic diols and aliphatic dicarboxylic acids by conventional procedures:

$$HO-R-OH + HOOC-R'-COOH \longrightarrow$$
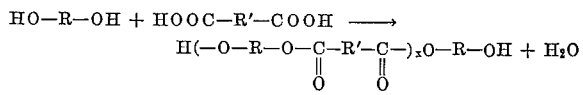

wherein R is a straight-chain or branched-chain alkylene radical containing from 2 to 20 carbon atoms and R' is a straight-chain or branched-chain alkylene radical containing from 0 to 20 carbon atoms and $x$ is an integer selected to give a polyester having a molecular weight of about 500 to about 5000. These low-molecular-weight polymers are prepared under reduced pressure in the presence of conventional ester interchange catalysts such as titanium tetraisopropoxide, dibutyltin oxide, and dibutyldiphenyltin. The diols may be primary or secondary and may contain from 2 to 20 carbon atoms. Examples of such diols are ethylene glycol, 1,2-propanediol, 1,4-butanediol, 1,9-nonanediol, and 2,2-dimethyl 1,3-propanediol. The dicarboxylic acids may contain from 2 to 20 carbon atoms. Examples of such acids include dimethylmalonic, adipic, azelaic and sebacic acids. The polyester may contain from 0.1 to 25.0 mole percent of an unsaturated dicarboxylic acid such as maleic, fumaric, itaconic, 3-cyclohexene-1,2-dicarboxylic, and bicyclo [2.2.1]-5-heptene-2,3-dicarboxylic acids. Polymers containing this type of unsaturation can be crosslinked by suitable treatments. Depending upon the amount of crosslinking which is introduced, the properties of elastomers can be modified appreciably. When the elastomers are sufficiently crosslinked, they are resistant to solvents. A calculated molar excess of the diol over the dicarboxylic acid is used in order to obtain hydroxy-terminated polyesters. Copolyester glycols may also be used, such as a copolymer prepared from ethylene glycol, 1,9-nonanediol, and azelaic acid or a copolymer prepared from 1,6-hexanediol, adipic acid, and sebacic acid. Also these copolymers may be prepared with alicyclic diols (such as 1,3- and 1,4-cyclohexanediol and 2,5- and 2,6-norbornanediol) or with cycloaliphatic diols (such as 1,3- and 1,4-cyclohexanedimethanol and 2,5- and 2,6-norbornanedimethanol). In addition, 0.1 to 3 mole percent of a polyol may be added to introduce some crosslinks in the polymer. Examples of these include trimethylolethane, trimethylolpropane, and pentaerythritol. The copolymers may be prepared with dicarboxylic acids which are alicyclic, cycloaliphatic, or aromatic. Examples of alicyclic acids include 1,3- and 1,4-cyclohezanedicarboxylic acids and 2,5- and 2,6-norbornanedicarboxylic acids. Examples of cycloaliphatic acids include 1,3- and 1,4-cyclohexanediacetic acids and 1,3- and 1,4-norbornanediacetic acids. Examples of aromatic acids include o-phthalic acid, isophthalic acid, and terephthalic acid. In addition, 0.1 to 3 mole percent of a polycarboxylic acid may be added, such as 1,3,5-benzenetricarboxylic acid, to introduce some crosslinks in the polymer. Suitable polyester glycols and copolyester glycols are those which have an average molecular weight within the range of about 500–5000.

The aliphatic polycarbonate glycols are prepared from aliphatic diols and phosgene or aliphatic diols and a dialkyl carbonate:

$$HO-R-OH + COCl_2 \longrightarrow$$
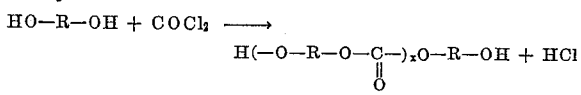

$$HO-R-OH + R'OCOR' \longrightarrow$$
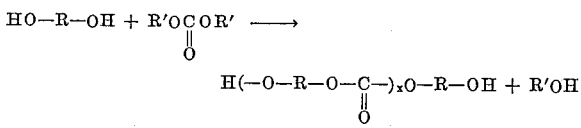

wherein R is a straight-chain or branched-chain alkylene radical containing from 4 to 20 carbon atoms, R' is an alkyl radical containing from 1 to 6 carbons and $x$ is an integer selected to give a polycarbonate having a molecular weight of about 500 to about 5000. The diols may be primary or secondary and may contain from 4 to 20 carbon atoms. A calculated molar excess of the diol is used in order to obtain hydroxy-terminated polymers. Except for diols containing less than 4 carbon atoms, the same diols used in preparing polyester glycols may be used in preparing these aliphatic polycarbonate glycols, which include copolycarbonate glycols. When the phosgene method of preparation is used, it is convenient to carry out the reaction in the presence of a tertiary amine, such as pyridine, which acts as an acid acceptor. When the dialkyl carbonate method of preparation is used, the low-molecular-weight polymers are prepared under reduced pressure in the presence of conventional ester interchange catalysts such as titanium tetraisopropoxide, dibutyltin oxide, and dibutyldiphenyltin. Suitable polycarbonate glycols and copolycarbonate glycols are those which have an average molecular weight within the range of about 500–5000.

The poly(etherurethane) glycols are prepared from diisocyanates and short-chain, hydroxy-terminated polyesters:

$$H(-O-R-)_nOH + OCN-R'-NCO \longrightarrow$$
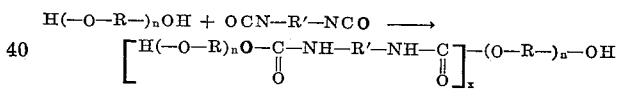

wherein R is a straight-chain or branched-chain alkylene radical containing from 2 to 4 carbon atoms and R' is selected from the group consisting of straight-chain and branched-chain alkylene radicals containing from 2 to 20 carbon atoms, phenylene and tolylene radicals, and methylenebisphenylene radicals and $x$ is an integer selected to give a poly(etherurethane) having a molecular weight of about 1500 to about 5000. Chloroformates of poly(etherurethane) glycol are prepared from diamines and the bischloroformates of short-chain, hydroxy-terminated polyethers:

$$ClC(-O-R-)_nO-CCl + NH_2-R'-NH_2 \longrightarrow$$
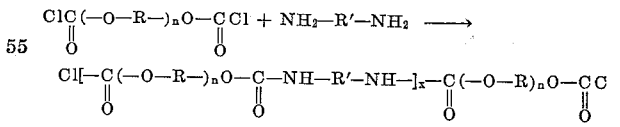

wherein R is a straight-chain or branched-chain alkylene radical containing from 2 to 4 carbon atoms and R' is selected from the group consisting of straight-chain and branched-chain alkylene radicals containing from 2 to 20 carbon atoms, phenylene and tolylene radicals, and methylenebisphenlyene radicals and $x$ is an integer selected to give a poly(etherurethane) having a molecular weight of about 1500 to about 5000. A calculated molar excess of the hydroxy-terminated or chloroformate-terminated polyether is used to give the proper molecular weight of the urethane polymer. Hydroxy-terminated polyethers (or their chloroformates) which may be used are polyethylene oxide, polypropylene oxide, poly(1,2-butylene oxide), and poly(tetramethylene oxide). The molecular weights of these polyethers may be 300–1000 and the "$n$" in the above formulas for the polyethers is an integer selected to give this molecular weight. Enough units are linked together by the diisocyanate or diamine to give short-chain polymers with average molecular weights of 1500–5000 and preferably 2000–3000. The diisocyanate may be aliphatic (straight or branched-chain) and may contain 2–20 carbon atoms. The diisocyanates also may be alicyclic or aromatic. Examples include hexamethylene diisocyanate, 2,2-dimethyl-1,4-tetramethylenediisocyanate, 1,4-cyclohexanediisocyanate, 2,4-tolylenediisocyanate, and methylene-p-phenylene diisocyanate. Diamines which may be used to link the bischloroformates together may be aliphatic (straight- or branched-chain) and may contain 2–20 carbon atoms. The diamines also may be alicyclic or aromatic. Examples include hexamethylenediamine, 1,4-cyclohexanebis(methylamine), 1,4-phenylenediamine, p,p'-methylenedianiline, and p-xylene-$\alpha,\alpha'$-diamine.

Bischloroformates of all of the polymer glycols just discussed are prepared by dissolving these short-chain polymers in an inert solvent such as ethylene dichloride or dioxane and passing in phosgene in excess of that theoretically required.

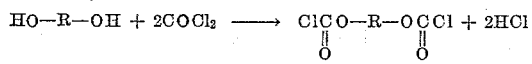

The solution is allowed to stand overnight, and then the hydrogen chloride which was formed and the excess phosgene are removed by passing in nitrogen. The chloroformate solution is placed in a volumetric flask and aliquot portions are used as needed.

The elastomeric polycarbonates may be prepared by either of two processes: the interfacial method or the tertiary amine procedure. In the interfacial process phosgene and the bischloroformate of the polymer glycol are added to a mixture containing the bisphenol, aqueous sodium hydroxide (which converts the bisphenol to the disodium salt), methylene chloride, and a catalyst (tertiary amine or quaternary ammonium salt). The combined molar amounts of the phosgene and bischloroformate are in slight excess over the molar amount of the bisphenol. Since the polymer dissolves in the methylene chloride phase, this layer becomes viscous as the polymer builds up. In the tertiary amine process phosgene is added to a solution containing a tertiary amine, methylene chloride, the bisphenol, and the polymer glycol. The bischloroformate of the polymer glycol may be added instead of the glycol itself. These processes for preparing polycarbonates are described in Plastics, 23, 122 (1958), U.S. Patent 3,028,365, and U.S. Patent 3,030,355.

The tertiary amine process is the preferred method for preparing the polycarbonate elastomers of this invention. Pyridine is the preferred amine, but other amines which may be used are triethylamine, tributylamine, and N,N-dimethylaniline. It is preferable, but not necessary, for a solvent for the polymer to be present, such as methylene chloride, ethylene dichloride, dioxane, or toluene. The reaction may be carried out at 0–50° C. It is most convenient for the temperature to be held at about 20–30° C.

In one embodiment of this invention phosgene is added to a solution containing a tertiary amine, the bisphenol, and the polymer glycol. By this procedure a somewhat random copolymer is obtained. In another embodiment of the invention phosgene is added to a solution of the bisphenol in a tertiary amine to form a short-chain poly-(bisphenol carbonate). The bischloroformate of the polymer glycol is then added, and a block polymer is obtained. Another procedure for obtaining a block polymer is to add the glycol bischloroformate to the bisphenol in a tertiary amine and then to add phosgene.

Usually it is necessary to add slightly over the theoretical amount of phosgene or phosgene plus bischloroformate to obtain a high polymer. Build-up of the polymer is indicated by an increase in viscosity of the amine solution. At the completion of the polymerization the solution is poured into water, which dissolves the amine hydrochloride and the excess amine. If no other solvent, such as methylene chloride, is present, the polymer precipitates. Better washing can be obtained if a water-immiscible solvent, such as methylene chloride, is present with the tertiary amine. The polymer solution can then be thoroughly washed with water. The polymer is precipitated by adding the solution to hexane, methanol, or other nonsolvent.

When the polymer glycol unit consists of a polyether or polyformal, it is advantageous to add a phenolic antioxidant to the elastomer solution before the precipitation step so that the precipitated polymer will contain some antioxidant. The antioxidant can also be added to the elastomer by conventional techniques. It is sometimes advantageous to add a fine powder such as titanium dioxide or talc before the elastomers are wet-spun, dry-spun, or melt-spun. The powder helps to prevent filaments which are tacky from sticking together.

The inherent viscosities of these elastomeric polycarbonates may be 0.50 or greater; however, for optimum results the inherent viscosities should be above 2.0.

The following examples are given for illustrative purposes only and should not be considered to represent the limits of the invention.

*Preparation of bisphenols*

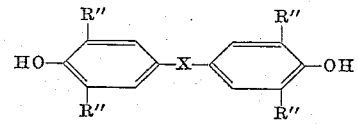

wherein X is a radical selected from the group consisting of

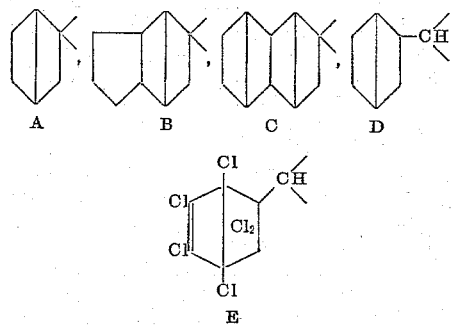

EXAMPLE 1

4,4'-(2-norcamphanylidene) diphenol ($X=A$, $R''=H$). Norcamphor may be prepared as described in Ann. 543, 1 (1940) or by the hydration of norbornene followed by oxidation as described in German Patent 951,867. A mixture containing 385 g. (3.5 moles) of norcamphor, 1320 g. (14 moles) of phenol, 2220 ml. of concentrated hydrochloric acid, and 18 ml. of 3-mercaptopropionic acid was stirred at 50° C. for 7 hrs. The mixture was allowed to stand at room temperature overnight and then the aqueous phase was decanted from the solid product. After the bisphenol was washed with water several times, it was dissolved in 2500 ml. of hot acetic acid and treated with decolorizing carbon. Hot water was then slowly added to the solution until crystallization began. After crystallization was complete, the product was collected, washed with 50 percent aqueous acetic acid, and dried. It weighed 868 g. (83 percent yield, calculated as the monohydrate). The bisphenol hydrate was dissolved in hot xylene containing a little acetone (to aid solution), and the water of hydration was removed by distillation of the xylene-water azeotrope. The unsolvated bisphenol crystallized on cooling. It melted at 199–200° C.

EXAMPLE 2

4,4'-(2-norcamphanylidene)bis[2,6-dichlorophenol] ($X=A$, $R''=Cl$). A stirred mixture containing 149 g. (0.50 mole) of 4,4'-(2-norcamphanylidene)diphenol hydrate (Example 1) and 800 ml. of acetic acid was heated to 40° C. Chlorine was then passed in, and the reaction temperature was held at about 45° C. by occasionally cooling with a water bath. The total amount of chlorine added was 149 g. (2.1 mole), measured as the weight loss of the lecture bottle. After the mixture had cooled to room temperature, the crystalline product was collected, washed with cold acetic acid, and dried. It weighed 171 g. (82 percent yield) and melted at 182–184° C. It was then recrystallized from ethylene dichloride.

EXAMPLE 3

4,4' - (2 - norcamphanylidene)bis[2,6-dibromophenol] ($X=A$, $R''=Br$). To a stirred mixture containing 149 g. (0.50 mole) of 4,4'-(2-norcamphanylidene)diphenol hydrate (Example 1) and 280 ml. of methanol was slowly added 320 g. (2.0 moles) of bromine while the temperature of the mixture was held at 20–25° C. with a cold-water bath. After the mixture had stood overnight, the crystalline product was collected, washed with methyl alcohol, and dried. It weighed 289 g. (97 percent yield). After recrystallization from aqueous acetic acid it melted at 180–181° C. It gave a correct analysis for 4 bromine atoms per molecule.

EXAMPLE 4

4,4' - (hexahydro - 4,7 - methanolindan-5-ylidene)diphenol ($X=B$, $R''=H$). Hexahydro-4,7-methanoindan-5-one may be prepared as described in J. Am. Chem. Soc., 67, 726 (1945). In this reference an incorrect structure is given for the ketone. The correct structure for the tricyclic ring system is given in J. Am. Chem. Soc., 68, 6 (1946). The bisphenol, prepared from this ketone by the procedure of Example 1, was obtained as a monohydrate. The unhydrated product, M.P. 221–223° C., was obtained after recrystallization from a 4:1 mixture of xylene and ethyl alcohol.

EXAMPLE 5

4,4' - (decahydro - 1,4-exo-5,8-endo-dimethanonaph-2-ylidene)diphenol ($X=C$, $R''=H$). Decahydro-1,4-exo-5,8-endo-dimethanonaphthalen-2-one may be prepared as described in Ann., 543, 20 (1940). The steric configuration of the rings is described in J. Am. Chem. Soc., 74, 1027 (1952). The bisphenol was prepared by the procedure of Example 1 with a reaction time of 21 hrs. Obtained as the hydrate, it melted at 244–245° C.

EXAMPLE 6

4,4' - (2 - norcamphanylmethylene)diphenol ($X=D$, $R''=H$). 2-norcamphanecarboxaldehyde was prepared by hydrogenation of the double bond in the acrolein-cyclopentadiene Diels-Alder adduct, described in Ann., 460, 119 (1928). The hydrogenation was carried out at room temperature, using 5 percent palladium on alumina catalyst. The bisphenol was prepared from this aldehyde by the procedure of Example 1 but at room temperature (exothermic reaction). The bisphenol, which did not form a hydrate, melted at 210–212° C.

EXAMPLE 7

4,4' - (2 - norcamphanylmethylene)bis[2,6 - dichlorophenol] ($X=D$, $R''=Cl$). The bisphenol of Example 6 was chlorinated by the procedure of Example 2. It melted at 166–168° C.

EXAMPLE 8

4,4' - [(1,4,5,6,7,7-hexachloro - 5 - norbornen - 2 - yl)methylene]diphenol ($E$, $R''=H$). 1,4,5,6,7,7-hexachloro-5-norbornene-2-carboxaldehyde was prepared as described in U.S. Patent 2,761,879. The bisphenol was prepared by the procedure of Example 1 but at room temperature. Melting at 143–155° C., it was a mixture of endo and exo isomers.

*Preparation of polymers*

EXAMPLE 9

A solution was prepared containing 16 g. (0.050 mole) of unsolvated 4,4'-(hexahydro-4,7-methanoindan-5-ylidene)diphenol, 24 g. (0.0089 mole) of poly(tetramethylene oxide) glycol of molecular weight 2700, 50 ml. of dry pyridine, and 200 ml. of methylene chloride. To this stirred solution was added 5.9 g. of phosgene (measured as the weight loss of the lecture bottle). The temperature was held at 20–25° C. with a water bath. The mixture was stirred for 5 minutes and then phosgene was added very slowly until the mixture began to become viscous. This required 0.7 g. of phosgene. As the solution viscosity increased, a total of 200 ml. more of methylene chloride was added. The mixture was then poured into water. After the methylene chloride layer was washed with dilute hydrochloride acid and then several times with water, it was slowly added to acetone to precipitate the polymer. It had an inherent viscosity of 2.48 and a softening point of 165° C. When the polymer was wet-spun from methylene chloride into ethyl alcohol, fibers were obtained with a tenacity of 0.5 g./den., an elongation of 40 percent, and an elastic recovery of 100 percent from an elongation of 300 percent. Similar properties were obtained when the polymer was dry-spun. The polymer was stabilized with 1 wt. percent of dioctyldiphenylamine and extruded into a clear, tough film. When the elastic properties were determined on film strips, the film had an elongation of 500 percent and an elastic recovery of 100 percent from an elongation of 400 percent.

EXAMPLE 10

The procedure of Example 9 was repeated, using 16.7 g. (0.040 mole) of 4,4'-(2-norcamphanylidene)bis[2,6-dichlorophenol], 25 g. (0.0093 mole) of poly(tetramethylene oxide) glycol of molecular weight 2700, 30 ml. of dry pyridine, 400 ml. of methylene chloride, and 5.4 g. of phosgene. A polymer was obtained with an inherent viscosity of 2.98 and a softening point of 180° C. When the polymer was wet-spun from methylene chloride into ethyl alcohol, fibers were obtained with a tenacity of 0.6 g./den., an elongation of 450 percent, an elastic recovery of 100 percent from an elongation of 400 percent, and a bar-sticking temperature of 155–160° C. The polymer was cast into a clear, tough film from methylene chloride, and the elastic properties were determined on film strips. The film had an elongation of 410 percent and an elastic recovery of 100 percent from an elongation of 400 percent. When the polymer was stabilized with 1 wt. percent of dioctyldiphenylamine and injection-molded, it retained its excellent elastic properties.

When the weight ratio of bisphenol to polyether glycol was 35:65 instead of 40:60 as above, fibers and films were obtained from solution with elongations of 500–550 percent and elastic recoveries of 100 percent. When stabilized with 1 wt. percent of dioctyldiphenylamine and extruded from the melt, fibers and films were obtained with elongations up to 600 percent and elastic recoveries of 100 percent.

EXAMPLE 11

To determine the difference in the properties of elastomeric polycarbonates prepared from an aliphatic bisphenol and from the alicyclic bisphenols of this invention, a polycarbonate elastomer was prepared from 40 wt. percent of 4,4'-isopropylidenediphenol and 60 wt. percent of poly(tetramethylene oxide) glycol of molecular weight 2700. The method of Examples 9 and 10, in which the ratio of bisphenol to polyether glycol was also 40:60, was used. A polymer was obtained with an inherent viscosity of 2.28 and a softening point of 120° C. When the polymer was wet-spun from methylene chloride into ethyl alcohol, fibers were obtained with a tenacity of 0.34 g./den., an elongation of 412 percent, an elastic recovery of 96 percent from an elongation of 400 percent, and a bar-sticking temperature of 90–100° C. The polymer was cast into a film from methylene chloride, and the elastic properties were determined on film strips. The film had an elongation of 430 percent and an elastic recovery of 93 percent from an elongation of 400 percent.

EXAMPLE 12

Example 10 was repeated, using a copolyether glycol. This glycol, which had a molecular weight of 4000, contained 70 percent by weight of tetramethylene oxide units, 20 percent by weight of ethylene oxide units, and 10 percent by weight of styrene oxide units. The polymer had an inherent viscosity of 1.89 and a softening point of 170° C. It had good elastomeric properties.

EXAMPLE 13

The method of Example 9 was used in preparing an elastomer from 23.9 g. (0.040 mole) of 4,4'-(2-norcamphanylidene)bis[2,6-dibromophenol] and 35.7 g. of poly-(tetramethylene oxide) glycol of molecular weight 3200. The polymer had an inherent viscosity of 1.56 and a softening point of 130° C. When the polymer was wet-spun from methylene chloride into ethyl alcohol, fibers were obtained with a tenacity of 0.5 g./den., an elongation of 400 percent, an elastic recovery of 100 percent from an elongation of 300 percent, and a bar-sticking temperature of 130° C. A clear, tough film was obtained by extrusion. It had an elongation of 450 percent and an elastic recovery of 100 percent from an elongation of 300 percent.

EXAMPLE 14

The bischloroformate of poly(tetramethylene oxide) glycol of molecular weight 3200 was used in preparing an elastomer with 4,4'-[(1,4,5,6,7,7-hexachloro-5-norbornen-2-yl)methylene]diphenol by a modification of the procedure of Example 9. To 0.050 mole of the bisphenol dissolved in the pyridine-methylene chloride solution was added 16 g. (0.0048 mole) of the bischloroformate dissolved in ethylene dichloride. The reaction mixture was stirred for 5 min., and then 5.0 g. of phosgene was added. A polymer was obtained with good elastomeric properties. It had an inherent viscosity of 1.74 and a softening point of 220° C.

EXAMPLE 15

To 5.0 g. of sodium hydroxide dissolved in 100 ml. of water was added 12 g. of 4,4'-(2-norcamphanylmethylene)bis[2,6-dichlorophenol] and 50 ml. of methylene chloride. While the temperature was held at 20–25° C. with a water bath, 1.5 g. of phosgene was added. The mixture was stirred for 5 minutes and then was added 50 ml. of an ethylene dichloride solution containing 17 g. of the bischloroformate of poly(tetramethylene oxide) glycol of molecular weight 1800. Also 4 drops of tributylamine (catalyst) was added. After the mixture was stirred for 20 min., 1.0 g. more of phosgene was added. While the mixture was stirred for 30 min., the lower organic layer became viscous. Acetic acid was then added to neutralize the alkali. After the organic layer was thoroughly washed with water, it was added to hexane to precipitate the polymer. The polymer had an inherent viscosity of 1.62 and a softening point of 170° C. It had good elastomeric properties.

EXAMPLE 16

The method of Example 9 was used in preparing an elastomer from 0.050 mole of 4,4'-(2-norcamphanylidene)bis[2,6-dichlorophenol] and 40 g. (0.020 mole) of the hydroxy-terminated polyformal (molecular weight 2000) of 1,10-decanediol. The polymer had an inherent viscosity of 2.73 and a softening point of 140° C. When the polymer was wet-spun from methylene chloride into ethyl alcohol, fibers were obtained with a tenacity of 0.6 g./den., an elongation of 450 percent, and an elastic recovery of 95 percent from an elongation of 200 percent.

EXAMPLE 17

Using triethylamine instead of pyridine, the method of Example 9 was used in preparing an elastomer from 17.3 g. (0.060 mole) of unsolvated 4,4'-(decahydro-1,4-exo-5,8-endo-dimethanonaphth-2-ylidene)diphenol and 52 g. (0.017 mole) of the hydroxy-terminated polyformal (molecular weight 3000) of 1,6-hexanediol. The polymer, which had good elastomeric properties, had an inherent viscosity of 2.19 and a softening point of 120° C.

EXAMPLE 18

The method of Example 9 was used in preparing an elastomer from 0.050 mole of 4,4'-(2-norcamphanylmethylene)bis[2,6-dichlorophenol] and 30 g. (0.021 mole) of the hydroxy-terminated polyester (molecular weight 1400) of 1,5-pentanediol and azelaic acid, added as the bischloroformate. The reaction mixture was stirred for 5 min. after addition of the bischloroformate before introduction of the phosgene (3.4 g.). The polymer had an inherent viscosity of 1.26 and a softening point of 170° C. When the polymer was wet-spun from methylene chloride into ethyl alcohol, fibers were obtained with a tenacity of 0.6 g./den., an elongation of 360 percent, and an elastic recovery of 100 percent from an elongation of 200 percent. Similar properties were obtained where the polymer was dry-spun and melt-spun.

EXAMPLE 19

The method of Example 9 was used in preparing an elastomer from 0.050 mole of unsolvated 4,4'-(hexahydro-4,7-methanoindan-5-ylidene)diphenol and 35 g. (0.014 mole) of the hydroxy-terminated polyester (molecular weight 2500) of diethylene glycol and dodecanedioic acid. The polymer had an inherent viscosity of 1.42 and a softening point of 165° C. It had good elastomeric properties when spun into fibers, extruded into film, and injection-molded into shaped objects.

EXAMPLE 20

The method of Example 9 was used in preparing an elastomer from 0.050 mole of unsolvated 4,4'-(2-norcamphanylidene)-diphenol and 15 g. (0.005 mole) of the hydroxy-terminated polyester (molecular weight 3000) of 1,9-nonanediol and maleic acid. The polymer, which had elastomeric properties, had an inherent viscosity of 1.08 and a softening point of 170° C. When a film of the polymer (cast from methylene chloride) containing 0.3 percent of cobalt naphthenate was heated for 2 hours at 150° C., it became crosslinked. The film was insoluble in all solvents.

EXAMPLE 21

The method of Example 9 was used in preparing an elastomer from 0.050 mole of 4,4'-(2-norcamphanylidene)bis[2,6-dichlorophenol] and 31 g. (0.017 mole) of the hydroxy-terminated polyester (molecular weight 1800) from 1,10-decanediol, azelaic acid, and maleic anhydride (molar ratio of 4.8:3.0:1.0). The polymer had an inherent viscosity of 2.06 and a softening point of 160° C. A film of the polymer containing 0.3 percent cobalt naphthenate was cast from methylene chloride. The film had an elongation of 350 percent and a recovery of 100 percent from an elongation of 200 percent. After the film was cured in an oven at 150° C. for 3 hr., it was swollen but not soluble in methylene chloride. The softening point had increased to 185° C., the elongation was 250 percent, and the film had a recovery of 99 percent from an elongation of 200 percent.

EXAMPLE 22

The method of Example 9 was used in preparing an elastomer from 0.050 mole of 4,4'-(2-norcamphanylmethylene)diphenol, 0.020 mole of 1,4-butenediol, and 16.5 g. (0.0069 mole) of a hydroxy-terminated polyester of molecular weight 2400 obtained from 1,10-decanediol and sebacic acid. When a film of the polymer (cast from methylene chloride) containing 0.3 percent cobalt naphthenate was heated in an oven at 150° C. for 3 hr., the film became crosslinked and had reduced solubility in organic solvents.

EXAMPLE 23

The method of Example 9 was used in preparing an elastomer from 23.9 g. (0.040 mole) of 4,4'-(2-norcamphanylidene)bis-[2,6-dibromophenol] and 15.9 g. of the hydroxy-terminated polyester (molecular weight 3500) of ethylene glycol, propylene glycol, and adipic acid (molar ratio of 17:4:20). The polymer had an inherent viscosity of 1.32 and a softening point of 185° C. By conventional techniques the polymer gave fibers, films, and shaped objects with elastomeric properties.

EXAMPLE 24

To a stirred solution of 16.0 g. (0.10 mole) of 1,9-nonanediol in 40 ml. of pyridine and 50 ml. of methylene chloride was added 9.2 g. (0.093 mole) of phosgene. After 5 min. a solution containing 8.6 g. (0.027 mole) of unsolvated 4,4'-(hexahydro-4,7-methanoindan-5-ylidene)diphenol in 40 ml. of dry pyridine was added. When 4.1 g. (0.041 mole) of phosgene was added, the solution became viscous. It was stirred for 10 minutes, poured into water, and treated as in Example 9. The polymer had an inherent viscosity of 1.34 and a softening point of 160° C. It had good elastomeric properties when spun into fibers, cast into film, or injection-molded into shaped objects.

EXAMPLE 25

The method of Example 9 was used in preparing an elastomer from 0.050 mole of 4,4'-[(1,4,5,6,7,7-hexachloro-5-norbornen-2-yl)methylene]diphenol and 30 g. (0.012 mole) of the hydroxy-terminated polycarbonate (molecular weight 2500) made from 1,6-hexanediol and diethyl carbonate. The polymer, which had good elastomeric properties, had an inherent viscosity of 1.57 and a softening point of 160° C.

EXAMPLE 26

A short-chain, hydroxy-terminated poly(etherurethane) was prepared from a 3:2 molar ratio of poly(tetramethylene oxide) glycol of molecular weight 900 and hexamethylene diisocyanate by heating these components together at 100° C. for 1 hr. An elastomer was prepared from 34 g. of this product and 0.050 mole of unsolvated 4,4'-(hexahydro-4,7-methanoindan-5-ylidene)-diphenol by the method of Example 9. The polymer had an inherent viscosity of 1.36 and a softening point of 170° C. It had good elastomeric properties when spun into fibers or injection-molded to give shaped objects.

EXAMPLE 27

The procedure of Example 26 was used in preparing an elastomer from 0.050 mole of 4,4'-(2-norcamphanylidene)bis[2,6-dichlorophenol] and 38 g. of the urethane product from a 4:3 molar ratio of polypropylene oxide glycol (molecular weight 650) and tolylene-2,4-diisocyanate. The polymer had good elastomeric properties. Its inherent viscosity was 1.18 and its softening point 180° C.

EXAMPLE 28

A short-chain, chloroformate-terminated poly(etherurethane) was prepared from a 3:2 molar ratio of the bischloroformate of poly(tetramethylene oxide) glycol of molecular weight 500 and p,p'-methylenedianiline. This was accomplished by adding 6.0 g. of the diamine to 18.8 g. of the bischloroformate in pyridine. An elastomer was prepared by adding 0.050 mole of 4,4'-(2-norcamphanylmethylene)diphenol and phosgene by the method of Example 9. A polymer was obtained with an inherent viscosity of 1.28 and a softening point of 145° C. It had good elastomeric properties.

EXAMPLE 29

The method of Example 9 was used in preparing an elastomer from 0.050 mole of unsolvated 4,4'-(hexahydro-4,7-methanoindan-5-ylidene)diphenol and an equal weight of a hydroxy-terminated polyvinyl methyl ether of molecular weight 2200 (sold as polymethoxy-alkanediol by General Aniline and Film Corporation). The polymer, obtained with an inherent viscosity of 1.28, had good elastomeric properties.

EXAMPLE 30

The method of Example 9 was used in preparing an elastomer from 0.050 mole of 4,4'-(2-norcamphanylidene)bis[2,6-dichlorophenol] and 31.5 g. of a copolyether glycol of molecular weight 3000 containing 85 percent by weight of tetramethylene oxide units from tetrahydrofuran and 15 percent by weight of units from 8-oxabicyclo[4.3.0]nonane. The polymer had an inherent viscosity of 2.39 and a softening point of 175° C. When the polymer was wet-spun from methylene chloride into ethyl alcohol, fibers were obtained with a tenacity of 0.5 g./den., an elongation of 500 percent, an elastic recovery of 100 percent from an elongation of 400 percent and a bar-sticking temperature of 140–150° C.

In the above examples and description reference has been made to the use of a copolyether glycol containing tetramethylene oxide units from tetrahydrofuran and 8-oxabicyclo[4:3:0]nonane. This copolyether glycol itself forms no part of the present invention but is the invention of Gerald R. Lappin and is described and claimed in his copending application, Serial No. 231,588 filed of even date herewith.

The elastomeric fibers of this invention are characterized by an exceptionally high elastic recovery: 100 percent in many cases from elongations of 300–600 percent. These fibers also have high tenacities and high bar-sticking temperatures. Depending upon the number of polymer glycol units in the composition, fibers may be obtained with elongations up to 600 percent or higher. Since all these polymers are soluble in volatile solvents such as methylene chloride, chloroform, dioxane, etc., fibers can be readily wet-spun and dry-spun from such solvents. Also, clear, tough elastomeric films with high elongations and excellent elastic recovery can be cast from these solvents. The solutions can be used for coating textiles, paper, wood, metal, glass, etc. Fibers, films, and molded objects also may be obtained by extrusion from the melt. In general, fibers and films with higher elongations are obtained from the melt, but it is often more convenient to obtain them from solution.

It may be desired to stabilize certain of the elastomer compositions to heat or to ultraviolet radiation. This may be accomplished very easily by incorporating conventional stabilizers in the polymers. Satisfactory stabilizers include phenols or phenolic derivatives such as 2,6-di-t-butyl-p-cresol, 2,2'-methylenebis(6 - t - butyl - p-cresol), or 4,4'-thiobis(6-t-butyl-m-cresol) and aromatic amines and amino derivatives such as N-phenyl-β-naphthylamine. In addition certain 2,4,6-trialkylated phenols having the general formula:

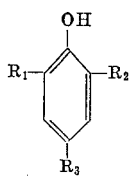

wherein $R_1$, $R_2$ and $R_3$ may be all the same or all different and are selected from the group consisting of alkyl groups of 1–20 carbon atoms may also be employed as stabilizers. The group of compounds in which the sum of the carbon atoms in groups $R_1$, $R_2$ and $R_3$ equals or exceeds a total of 20 is of particular interest for the purposes of this invention. The preferred group of compounds are those derived from p-cresol, i.e., those in which $R_3$ is methyl, $R_1$ and $R_2$ are straight chain alkyl groups or possess a minimum of chain branching and the sum of the carbon atoms in groups $R_1$ and $R_2$ equals or exceeds 19. Among these preferred compounds are 2,6-di-n-dodecyl-p-cresol, 2,6-di-n-octadecyl-p-cresol, 2,6-di(1-methylheptadecyl)-p-cresol and 2-methyl-6-octadecyl-p-cresol. The use of the 2,4,6-trialkylated phenols of the type represented by the above structural formula form no part of the instant invention but is the invention of Charles J. Kibler, Alan Bell and James G. Smith and is described and claimed in their copending application Serial No. 166,155, filed January 15, 1962.

The elastomeric filaments, fibers, yarns, films, and other shaped objects which may be obtained from the polymers of this invention are useful in the fabrication of many articles, such as brassieres, girdles, hosiery, bathing suits, suspenders, garters, sweaters, jackets, ski togs, skirts, hats, gloves, tapes, ribbons, belting, shoe fabrics upholstery, bandages, hair nets, dish covers, ropes, bindings balls, fabric coatings, safety glass interlayers, flexible tubing, wire coatings, pipe coverings, packaging materials, gaskets, weather-stripping, paint additives, etc.

Although the invention has been described in considerable detail with particular reference to certain preferred embodiments thereof, variations and modifications can be effected within the spirit and scope of the invention as described hereinabove and as defined in the appended claims.

We claim:
1. A highly elastic polycarbonate comprising the reaction product derived from (A) at least one compound selected from the class consisting of bisphenols having the following general formula:

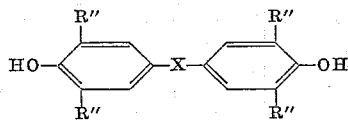

wherein R" is a member selected from the group consisting of hydrogen atoms, halogen atoms, and alkyl groups containing from 1 to 4 carbon atoms and X is a gem-bivalent radical selected from the group consisting of radicals having the following general formulas:

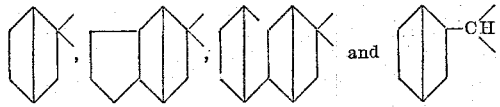

and (B) at least one member of average molecular weight about 500 to about 5000 of the group consisting of hydroxy-terminated and chloroformate-terminated polyethers, polyformals, polyesters, aliphatic polycarbonates, and poly(etherurethanes) and (C) phosgene, the final elastic polymer being one in which the bisphenol units are present in an amount corresponding to 15–17 weight percent of the final polymer.

2. The highly elastic polycarbonate of claim 1 wherein the (B) reactant is selected from the group consisting of hydroxy-terminated and chloroformate-terminated polyethers of average molecular weight about 500 to about 5000, the polyether having the structural formula:

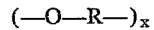

wherein R is a radical selected from the group consisting of the straight-chain and branched-chain alkylene radicals containing from 2 to 20 carbon atoms and $x$ is an integer selected to give a polyether having a molecular weight of about 500 to about 5000.

3. The highly elastic polycarbonate of claim 1 wherein the (B) reactant is selected from the group consisting of hydroxy-terminated and chloroformate-terminated polyformals of average molecular weight of about 500 to about 5000, the polyformal having the structural formula:

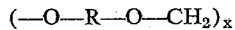

wherein R is a radical selected from the group consisting of the straight-chain and branched-chain alkylene radicals containing from 4 to 20 carbon atoms and $x$ is an integer selected to give a polyformal having a molecular weight of about 500 to about 5000.

4. The highly elastic polycarbonate of claim 1 wherein the (B) reactant is selected from the group consisting of hydroxy-terminated and chloroformate-terminated polyesters of average molecular weight of about 500 to about 5000, the polyester having the structural formula:

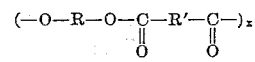

wherein R is a radical selected from the group consisting of the straight-chain and branched-chain alkylene radicals containing from 2 to 20 carbon atoms and R' is a radical selected from the group consisting of the straight-chain and branched-chain alkylene radicals containing from 0 to 20 carbon atoms and $x$ is an integer selected to give a polyester having a molecular weight of about 500 to about 5000.

5. The highly elastic polycarbonate of claim 4 wherein R contains an olefinic linkage.

6. The highly elastic polycarbonate of claim 4 wherein R' contains an olefinic linkage.

7. The highly elastic polycarbonate of claim 1 wherein the (B) reactant is selected from the group consisting of hydroxy-terminated and chloroformate-terminated polycarbonates of average molecular weight of about 500 to about 5000, the polycarbonate having the structural formula:

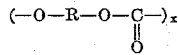

wherein R is a radical selected from the group consisting of the straight-chain and branched-chain alkylene radicals containing from 4 to 20 carbon atoms and $x$ is an integer selected to give a polycarbonate having a molecular weight of about 500 to about 5000.

8. The highly elastic polycarbonate of claim 1 wherein the (B) reactants is selected from the group consisting of hydroxy-terminated and chloroformate-terminated poly(etherurethanes) of average molecular weight of about 1500 to about 5000, the poly(etherurethane) having the structural formula:

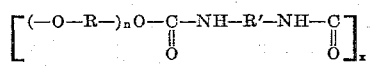

wherein R is a radical selected from the group consisting of the straight-chain and branched-chain alkylene radicals containing from 2 to 4 carbon atoms and R' is selected from the group consisting of straight-chain and branched-chain alkylene radicals containing from 2 to 20 carbon atoms, phenylene and tolylene radicals, and methylenebisphenylene radicals, $n$ is an integer selected to give a polyether having a molecular weight of from about 300 to about 1,000 and $x$ is an integer selected to give a poly(etherurethane) having a molecular weight of about 1500 to about 5000.

9. The highly elastic polycarbonate of claim 2 wherein the (B) reactant is poly(tetramethylene oxide) glycol.

10. The highly elastic polycarbonate of claim 3 wherein the (B) reactant is the hydroxy-terminated polyformal of 1,10-decanediol.

11. The highly elastic polycarbonate of claim 4 wherein the (B) reactant is the hydroxy-terminated polyester of azelaic acid and 1,5-pentanediol.

12. The highly elastic polycarbonate of claim 5 wherein the (B) reactant is the hydroxy-terminated polyester of 1,10-decanediol, azelaic acid, and maleic anhydride in a molar ratio of 4.8:3.0:1.0.

13. The highly elastic polycarbonate of claim 9 wherein the (A) reactant is 4,4'-(2-norcamphenylidene)bis[2,6-dichlorophenol] and the (B) reactant is poly(tetramethylene oxide) glycol of average molecular weight of about 1500 to about 3500, the (A) and (B) reactants being in a weight ratio of 40:60.

14. The highly elastic polycarbonate of claim 9 wherein the (A) reactant is 4,4'-(2-norcamphenylidene)bis[2,6-dibromophenol] and the (B) reactant is poly(tetramethylene oxide) glycol of average molecular weight of about 1500 to about 350, the (A) and (B) reactants being in a weight ratio of 40:60.

15. The highly elastic polycarbonate of claim 9 wherein the (A) reactant is 4,4'-(hexahydro-4,7-methanoindan-5-ylidene) diphenol and the (B) reactant is poly(tetramethylene oxide) glycol of average molecular weight of about 1500 to about 3500, the (A) and (B) reactants being in a weight ratio of 40:60.

16. The highly elastic polycarbonate of claim 9 wherein the (A) reactant is 4,4'-(2-norcamphenylmethylene)bis-[2,6-dichlorophenol] and the (B) reactant is poly(tetramethylene oxide) glycol of average molecular weight of about 1500 to about 3500, the (A) and (B) reactants being in a weight ratio of 40:60.

References Cited by the Examiner

UNITED STATES PATENTS

| | | | |
|---|---|---|---|
| 2,761,879 | 9/1956 | Soloway | 260—47 |
| 3,029,291 | 4/1962 | Dietzler | 260—619 |
| 3,075,949 | 1/1963 | Caldwell | 260—47 |
| 3,161,615 | 12/1964 | Goldberg | 260—47 |

SAMUEL H. BLECH, *Primary Examiner.*

UNITED STATES PATENT OFFICE
CERTIFICATE OF CORRECTION

Patent No. 3,287,442                                November 22, 1966

John R. Caldwell et al.

It is hereby certified that error appears in the above numbered patent requiring correction and that the said Letters Patent should read as corrected below.

Column 1, line 53, for "consist" read -- consists --; column 3, line 30, and column 8, line 33, the formulas, each occurrence, should appear as shown below instead of as in the patent:

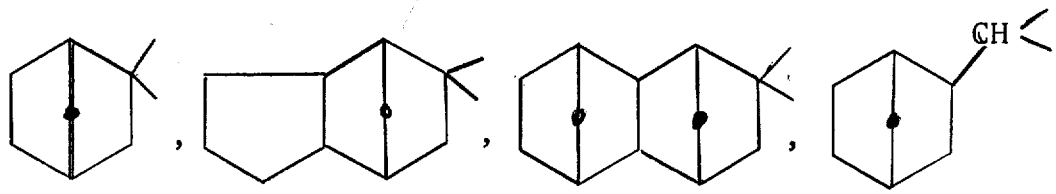

same column 3, line 45, the formula should appear as shown below instead of as in the patent:

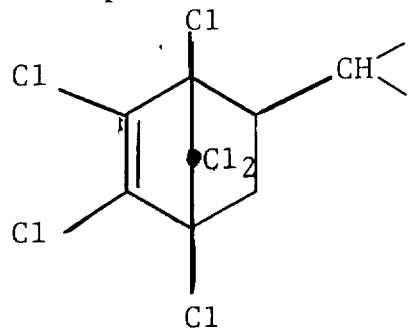

column 4, line 3, for "4,4'-(tricyclo[2.2.1.0$^{2,6}$]" read -- 4,4'-(tricyclo[2.2.1.0$^{2.6}$] --; column 5, line 62, for "1,4-cyclohezanedicar-" read -- 1,4-cyclohexanedicar- --; column 6, lines 36 and 37, for "polyesters" read -- polyethers --; column 7, line 48, for "3,030,355" read -- 3,030,335 --; column 8, line 40, the formula should appear as shown below instead of as in the patent:

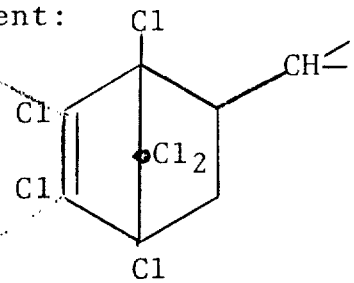

column 15, line 48, the formulas should appear as shown below instead of as in the patent:

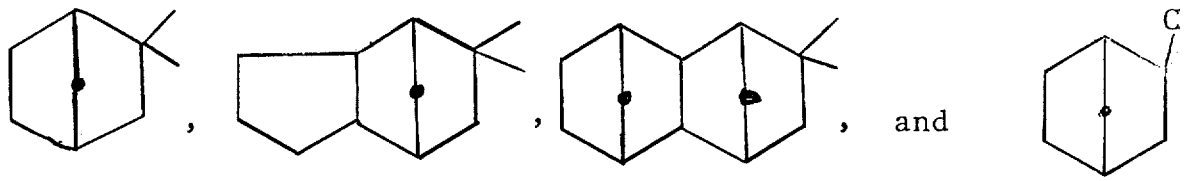

line 58, for "17" read -- 70 --; column 17, line 5, for "350" read -- 3500 --.

Signed and sealed this 24th day of October 1967.

(SEAL)
Attest:

EDWARD M. FLETCHER, JR.
Attesting Officer

EDWARD J. BRENNER
Commissioner of Patents